July 2, 1963  M. W. GOULD  3,096,044
HELICOPTER

Filed Feb. 8, 1962  2 Sheets-Sheet 1

INVENTOR.
M. W. Gould

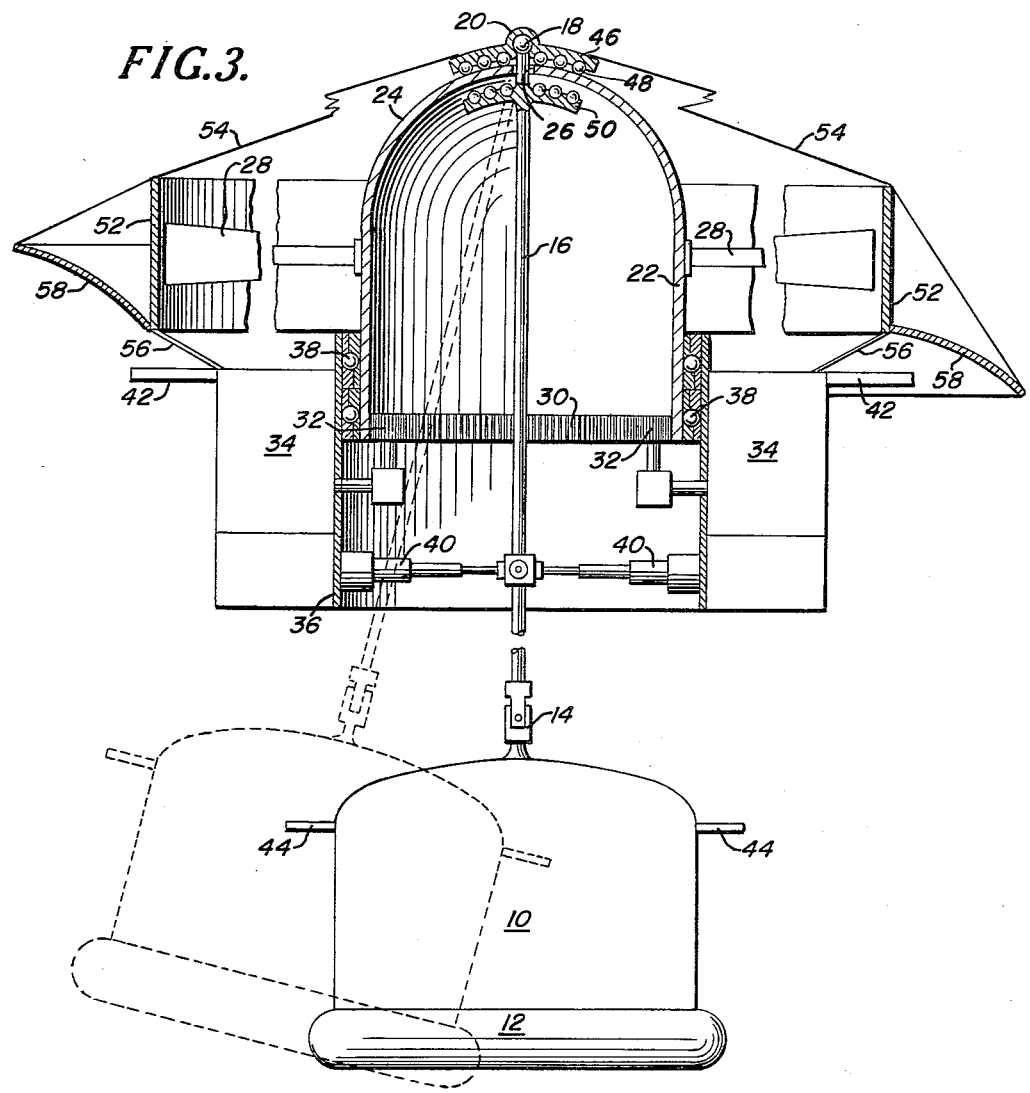

United States Patent Office 3,096,044
Patented July 2, 1963

3,096,044
HELICOPTER
Murray Whitfield Gould, Mink Hollow Road,
Highland, Md.
Filed Feb. 8, 1962, Ser. No. 172,032
16 Claims. (Cl. 244—12)

This invention relates to an aircraft of the helicopter type, wherein the vertical lift and the horizontal thrust is accomplished by the same propeller.

Heretofore, propellers of this type of aircraft have to be capable of feathering, that is the independent blades are capable of rotation on their own longitudinal axis, in order to compensate for the difference of air pressure on the opposite blades of the propeller when in horizontal motion. This necessity results in many moving parts and multiple controls, making the aircraft complicated to operate and very expensive to manufacture.

It is the object of this invention to provide an aircraft which has a minimum of moving parts and has a single control for directional flight.

It is another object of the present invention to provide a hollow rotating shaft to which blades of a propeller are fixedly attached and to provide an annular shield for the propeller thus forcing air to meet the propeller blades in a stream which is parallel to the rotating shaft.

It is a further object of the invention to provide a cap for the hollow shaft and supporting a load from the cap, the load supporting member extending within the rotating shaft and further supporting the member for limited movement relative to the shaft.

It is a still further object of the invention to provide a hollow cylindrical housing for said shaft, said housing to be provided with means serving to provide a torque to said cylindrical housing which is opposite to the rotation of the hollow shaft.

A still further object of the invention is to provide means for shifting the load carrying means relative to the rotating shaft and cylindrical housing to shift the center of gravity of the aircraft which will tilt the cylindrical housing, rotating shaft and propeller at an angle to provide a horizontal thrust component.

It is a still further object of the invention to provide wing surfaces carried by the annular shield to assist in supporting the aircraft when in horizontal flight.

Figure 1:
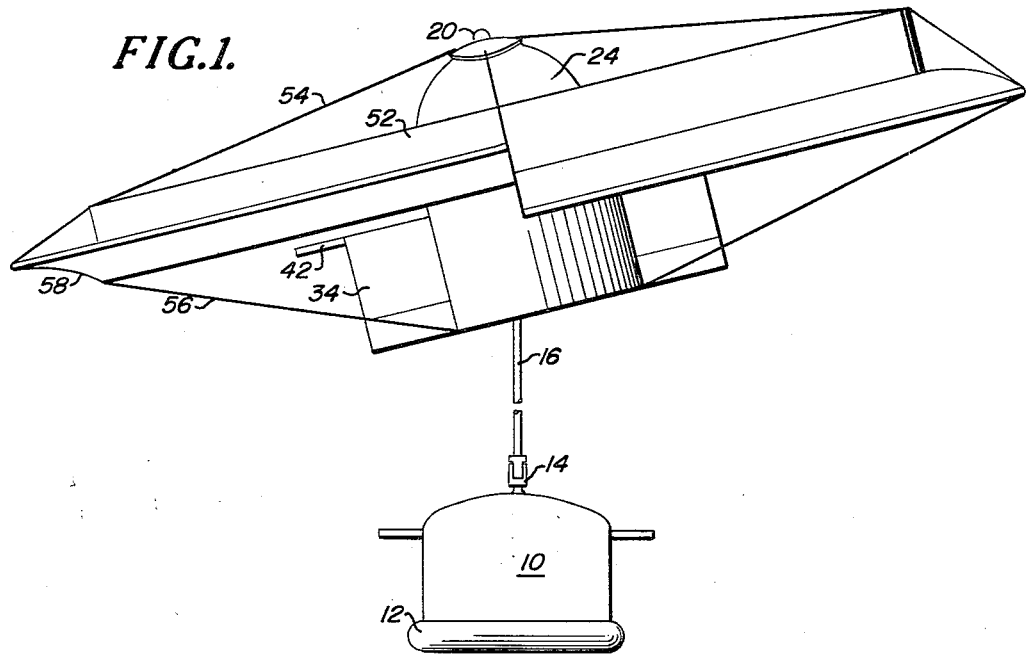
Figure 2:
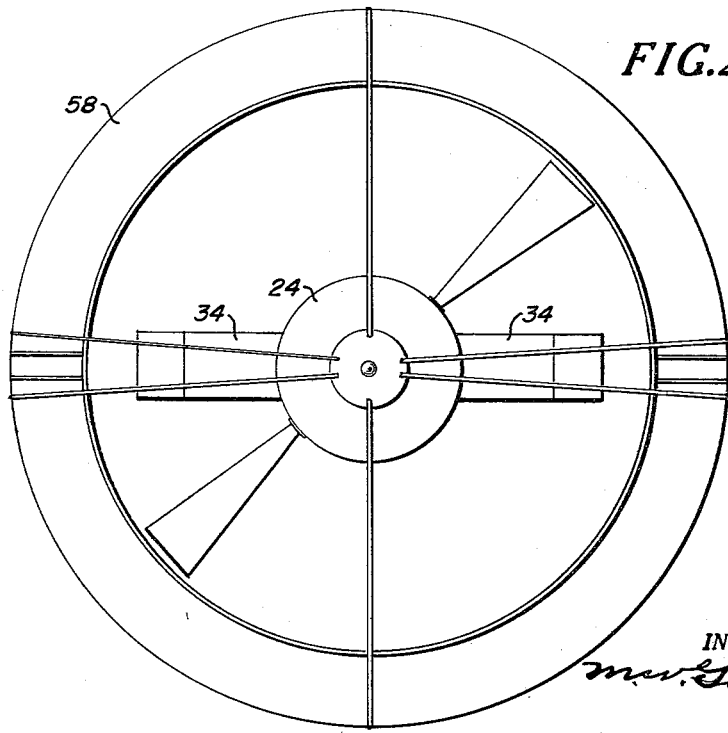

The invention is illustrated in the accompanying drawing, wherein,

FIGURE 1 is a front elevation.
FIGURE 2 is a top plan view.
FIGURE 3 is a vertical cross-section with the load carrying car in elevation.

Referring to the drawings wherein like numbers denote like parts throughout the figures, the aircraft has a load carrying car 10 which may be of any size or shape and have wheels, skids or pontoons attached for contact with the ground or water. It is here shown with a pneumatic cushion 12 and a supporting limited motion universal joint 14.

The universal joint 14 is connected to a tube 16 which terminates in a ball 18 supported in socket 20. A hollow shaft 22 is formed with a semi-spherical end 24 having a central opening 26. The shaft has fixedly mounted thereon a plurality of propeller blades 28. The blades 28 extend at right angles to the shaft and are fixed to the shaft, rotating therewith and maintaining their right-angled position regardless of the angle the hollow shaft is to the vertical. The shaft is shown with a ring gear 30 driven by pinions 32 from motor 34. While the invention is shown with a pair of motors, one may be used or any number provided. Arranged in pairs, they produce a balanced unit.

A cylindrical housing 36 supports the motors and is journalled to the hollow shaft by bearings 38. These bearings are of the type to rotatively connect the two hollow members and at the same time prevent relative longitudinal movement between the hollow shaft and the cylindrical housing. Mounted on the inside of the housing and below the hollow shaft, a plurality of hydraulically operated cylinders 40 extend toward the center and are attached to the load supporting tube 16. Means for operating the hydraulic cylinders is carried in the cab 10 and may be any conventional system.

Also carried by the housing 36 are fins 42 which are adjustable to extend more or less from the housing. These fins are set at an angle to encounter the air stream from the propeller and to counteract any torque imparted to the cylindrical housing through the bearings. By adjusting the length of the fins, the rotation of the housing relative to the rotating hollow shaft may be controlled. Similar fins 44 attached to the cab 10 function in a similar manner to counteract any tendency of the cab to turn or to permit slight turning to orient the cab for directional travel.

Seated on the semi-spherical end 24 of the hollow shaft, a cap 46 formed with the socket 20 carries the load. The cap and load are supported on bearings 48 which permit the load to remain free of rotation while the semi-spherical end is turning. A second bearing plate 50 carried by the tube 16 engages the inside of the semi-spherical end 24 to prevent longitudinal movement of the tube 16.

An annular shield 52 supported by rods 54 and braces 56 surrounds the propeller and channels the incoming air as well as directs the airstream from the propeller. Auxiliary wings 58 set at such an angle as is advisable to support the plane when the hollow shaft is at an angle to the vertical are attached to the shield. These wings may or may not be used. They will provide support while in horizontal flight but are not considered a necessity.

The operation of the aircraft may be briefly described as follows.

The controls in the cab (which are not shown) are of a conventional type and consist in ordinary controls for motors with accelerator, clutch or automatic clutch, and starter. With the motors started, the propeller is reved sufficiently to lift the aircraft vertically to any desired height. The fins are adjusted with the speed of the motor so that the cylindrical housing and cab are oriented for directional travel and are not turning. The hydraulic cylinders are actuated pulling the supporting tube and cab out of the vertical center, shifting the center of gravity of the aircraft. Actually the tube and cab will remain substantially vertical, while the cylindrical housing, the hollow shaft, the annular shield and wings will assume an angle to the vertical. The air stream will be directed at an angle to the vertical, any angle desired, and the aircraft will be given a horizontal thrust, sufficient to move it horizontally while still maintaining the vertical position above the ground.

By adjustment of the fins gradually, the cab and cylindrical housing may be partially rotated so that the cab may have a forward section and a rearway section, so that the cab may face the direction of horizontal movement.

At any time horizontal movement may be arrested by a shift of the tube supported cab to change the angle at which the air stream is directed.

The auxiliary wings, set at the proper angle could serve to partially support the aircraft should the angle of the air stream be such that support was needed.

What is claimed as new is:

1. An aircraft of the helicopter type, comprising a rotatable hollow shaft having one end substantially closed, a plurality of blades fixed to said shaft and rotatable therewith, a hollow cylinder partially housing said shaft, means carried by said cylindrical housing journalling said shaft to permit relative rotation between said shaft and said cylindrical housing, means supported by said housing for rotating said shaft, a load supporting tube carried within said hollow shaft, means journalled on the closed end of said shaft and attached to said tube to support said load supporting tube for relative rotation between said hollow shaft and said tube, a load carried by said tube, means carried by said cylindrical housing and attached to said load supporting tube to move said tube from its normal position concentric with said hollow shaft and said cylindrical housing to a position at an angle to the longitudinal axis of said hollow shaft to change the center of gravity of said aircraft, adjustable means carried by said cylindrical housing for counteracting the rotative force of the hollow shaft, and an annular shield supported by said cylindrical housing and said tube supporting means to encircle the ends of said plurality of blades.

2. An aircraft according to claim 1, wherein the plurality of blades are fixed to the hollow shaft against relative movement between said shaft and said blades.

3. An aircraft according to claim 1, wherein the cylindrical housing is spaced from said hollow shaft by bearings which serve as both rotational bearing members and thrust bearings to serve as supporting connections between said hollow shaft and said cylindrical housing.

4. An aircraft according to claim 1, wherein the means for rotating the hollow shaft are internal combustion engines, two or more arranged in balanced spaced relation about said cylindrical housing and connected to said hollow shaft to rotate said shaft.

5. An aircraft according to claim 1, wherein the means for moving said load supporting tube from a position concentric with said hollow shaft to a nonconcentric position are a plurality of movable pistons connected to said cylindrical housing and attached to said tube to move said tube, by the contraction of some of the pistons and elongation of others.

6. An aircraft according to claim 1, including an auxiliary wing surface attached to said annular shield.

7. An aircraft of the helicopter type according to claim 1, wherein the adjustable means for counteracting the rotative force of the hollow shaft are a plurality of adjustable paddles extending from the cylindrical housing to within the airstream from the blades of the hollow shaft to control relative rotation of the hollow shaft and said cylindrical housing.

8. An aircraft according to claim 1, wherein the load is a passenger or freight carrying car attached to said tube.

9. An aircraft according to claim 8 including controls carried within the car and extending to the engines and said tube moving means.

10. An aircraft according to claim 1, wherein the tube supporting means is a cap journalled on the substantially closed end of said hollow shaft and a universally connecting means between said cap and said tube.

11. An aircraft according to claim 1 and including bearing means attached to said tube and engaging the inside of said shaft closed end to prevent longitudinal movement of said tube relative to said hollow shaft.

12. An aircraft of the helicopter type comprising a rotatable hollow shaft formed with a substantially closed semi-spherical end, a plurality of blades fixedly attached against independent motion, to said hollow shaft, a cylindrical housing partially enclosing said hollow shaft and concentric therewith, bearing supports connecting said cylindrical housing and said hollow shaft to support said cylindrical housing against vertical displacement relative to said hollow shaft and for independent rotation of the housing relative to the shaft, a cap journalled on said semi-spherical closed end of the hollow shaft, a tube extending through said closed end and the length of the hollow shaft and the cylindrical housing and projecting beyond, said tube being held normally in a position coinciding with the longitudinal axis of said hollow shaft for vertical flight of the aircraft and moved to a position not coinciding with said longitudinal axis for horizontal flight of the aircraft, said tube being attached to said journalled cap, and other journalling means carried by said tube and engaging the inner side of said semi-spherical end to prevent longitudinal movement of said tube relative to said shaft, a plurality of engines balanced relative as to position on said aircraft, said engines being carried on the outer surface of said cylindrical housing and connected to said hollow shaft to rotate said shaft, adjustable means carried by said cylindrical housing and projecting into the airstream from said blades to counteract the rotative force of said rotative shaft to control relative rotation between said housing and said shaft, a load carrying car supported on the end of said tube extending beyond said housing, means supported by said cylindrical housing and attached to said tube to move said tube from a position coinciding with the longitudinal axis of said hollow shaft to a position shifting the center of gravity of said aircraft, an annular shield arranged beyond and in close proximity to the ends of said blades to house said blades and restrict the course of said airstream, and means carried by said car for controlling both vertical and horizontal flight and relative rotation of said hollow shaft and said cylindrical housing.

13. An aircraft of the helicopter type, comprising a rotatable hollow shaft having one end substantially closed, means concentric with and partially housing said rotatable shaft, journalling means between said hollow shaft and said housing means to permit relative rotation of said hollow shaft and said housing means, a load, a load supporting means normally positioned along the longitudinal axis of said hollow shaft, means carried by said substantially closed end of said hollow shaft connected to and supporting said load supporting means, and means attached to said housing means and said load supporting means for moving said load supporting means from its position along the longitudinal axis of said hollow shaft to a position at an angle to said longitudinal axis, a propeller carried by said hollow shaft and an annular shield for said propeller.

14. An aircraft of the helicopter type, comprising a rotatable hollow shaft, means for rotating said shaft, said shaft having one substantially closed end, propeller blades fixed to said shaft to rotate therewith but without independent motion of their own, a cylinder partially housing said hollow shaft and supporting said shaft rotating means, bearings between said cylindrical housing and said hollow shaft journalling each with respect to the other for relative rotation and otherwise preventing relative longitudinal motion, a plurality of fins adjustably mounted on said cylinder and extending into the air stream from the propeller blades sufficiently to control rotation of said cylinder relative to said hollow shaft, a cap journalled on the substantially closed end of said hollow shaft, a tube attached to said cap and extending inwardly and normally concentric with the longitudinal axis of said hollow shaft and said cylinder, a load carried by said tube, means carried by said cylinder and attached to said tube to shift the tube to a position not concentric with the longitudinal axis of said hollow shaft and said cylinder, an annular shield supported by said cap and said cylinder enclosing the ends of said propeller blades to direct the air passing through the propeller.

15. An aircraft of the helicopter type, comprising a motor, a hollow shaft connected to be rotated by the motor, said hollow shaft having a partially closed end, a propeller blade fixed to said shaft and rotatable therewith, a hollow cylinder partially housing said hollow shaft and supporting said motor, journalling means carried between said hollow cylinder and said hollow shaft, means journalled on the closed end of said hollow shaft to carry a load and means connected to said load carrying means and said hollow cylinder to change the relative position of said load carrying means and said hollow cylinder.

16. A helicopter comprising a hollow drive shaft, propeller blades fixed to said shaft being formed with a semi-spherical head having a central opening therein and rotating with said shaft, a cylindrical housing concentric with said shaft and journalled to said shaft to permit independent rotation about a common longitudinal axis between said shaft and said cylindrical housing, said shaft and said cylindrical housing moving otherwise as a unit, an annular shield surrounding said propeller blade ends and movable with said cylindrical housing, supporting wing surfaces carried by said shield, a tube extending longitudinally of said shaft and said cylindrical housing and extending through the central opening of said semi-spherical head, means attached to said tube and engaging the outer and inner surfaces of said semi-spherical head to support said tube in independent rotational relationship with said shaft, means carried by said cylindrical housing and attached to said tube to move said tube out of a position coincidental with the longitudinal axis of said hollow shaft and said cylindrical housing, means carried by said housing for rotating said shaft, and a mass attached to said tube at a point beyond said housing.

References Cited in the file of this patent

UNITED STATES PATENTS

| | | |
|---|---|---|
| 2,806,662 | Yonkers | Sept. 17, 1957 |
| 2,932,353 | Armstrong | Apr. 12, 1960 |

FOREIGN PATENTS

| | | |
|---|---|---|
| 504,942 | Great Britain | May 2, 1939 |